No. 626,833. Patented June 13, 1899.
E. S. HALSEY.
SYSTEM OF ELECTRIC METERING.
(Application filed July 1, 1898.)

(No Model.) 2 Sheets—Sheet 1.

Witnesses:
Frank S. Blanchard
J. E. Palmer.

Inventor:
Edward S. Halsey

THE NORRIS PETERS CO., PHOTO-LITHO., WASHINGTON, D. C.

No. 626,833. Patented June 13, 1899.
E. S. HALSEY.
SYSTEM OF ELECTRIC METERING.
(Application filed July 1, 1898.)
(No Model.) 2 Sheets—Sheet 2.
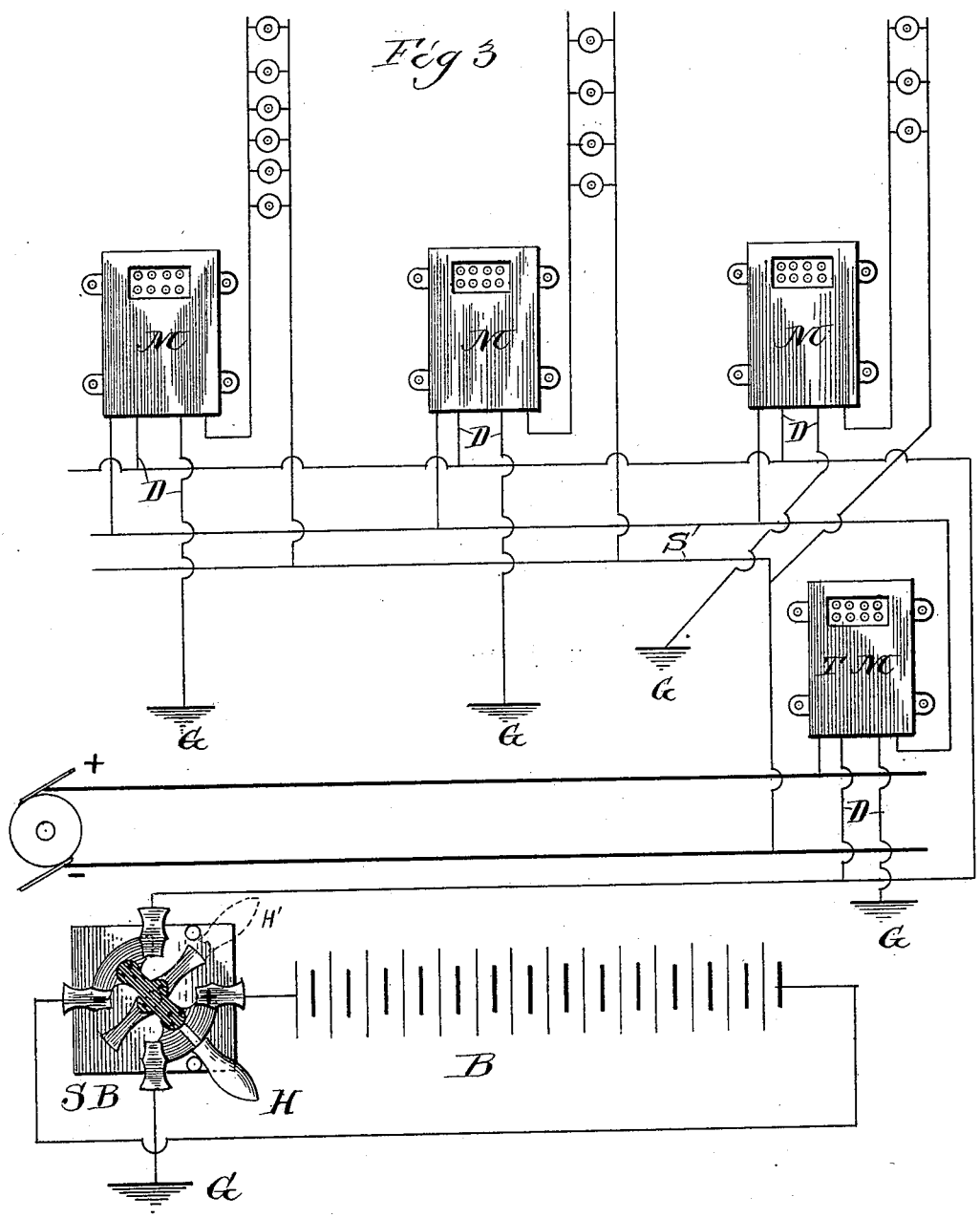
Witnesses
W. C. Corlies
Wm Geiger
Inventor
Edward S. Halsey

UNITED STATES PATENT OFFICE.

EDWARD S. HALSEY, OF CHICAGO, ILLINOIS.

SYSTEM OF ELECTRIC METERING.

SPECIFICATION forming part of Letters Patent No. 626,833, dated June 13, 1899.

Application filed July 1, 1898. Serial No. 684,945. (No model.)

*To all whom it may concern:*

Be it known that I, EDWARD S. HALSEY, a citizen of the United States, residing at Chicago, in the county of Cook and State of Illinois, have invented a new and useful System of Electric Metering, of which the following is a specification.

My invention relates to a system for the sale of electricity whereby two or more rates are quoted to the customer, each applying to a certain period of time during which it shall have been previously determined current could be sold for to the best advantage at the price fixed for those hours.

My object in carrying out my invention is to introduce a very simple, reliable, and inexpensive method of registering to the account of each customer the current used by them during the maximum load hours on one dial of their respective meters and all current used by them during other hours on another dial; also, to furnish a means of detecting and rectifying errors in registration caused by occasional failure in operation of some of the dial rate-shifters, as will be explained.

My invention consists of two interchangeable registering mechanisms at each point of consumption, a means of throwing one set off and the other set on, as desired, from the generating-station or center of distribution by means of an electric circuit, which in most cases will consist of the neutral wire of the lighting system and a ground return, as it is generally considered to be no disadvantage to have the neutral wire grounded.

Referring to the accompanying drawings, which illustrate the manner in which I prefer to carry out my invention, similar numerals or letters refer to similar parts throughout the several views, in which the customary plus and minus signs indicate positive and negative conductors or parts, respectively.

Figure 1:
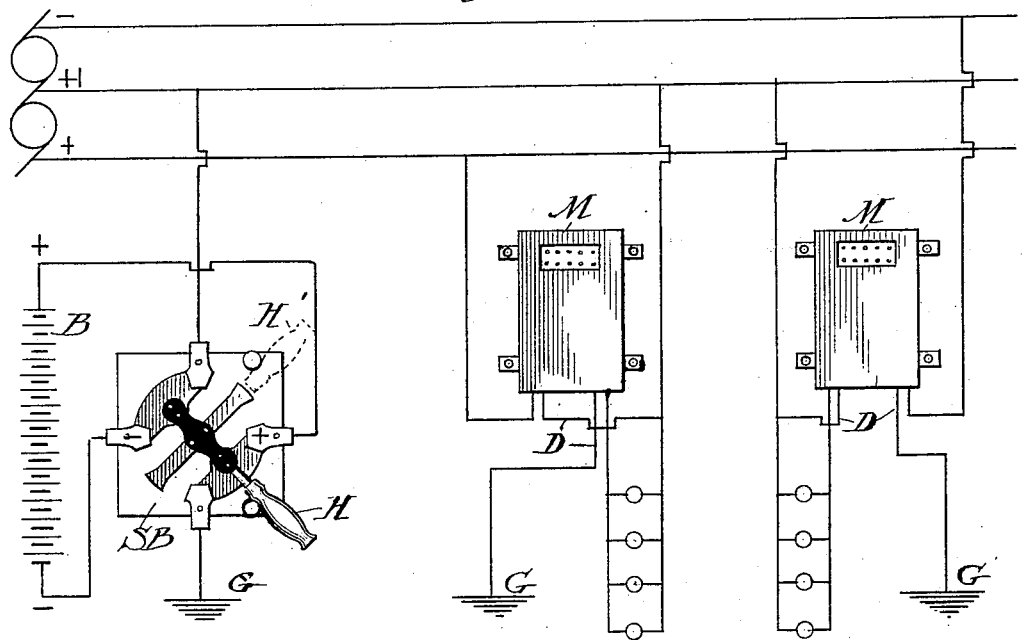
Figure 2:
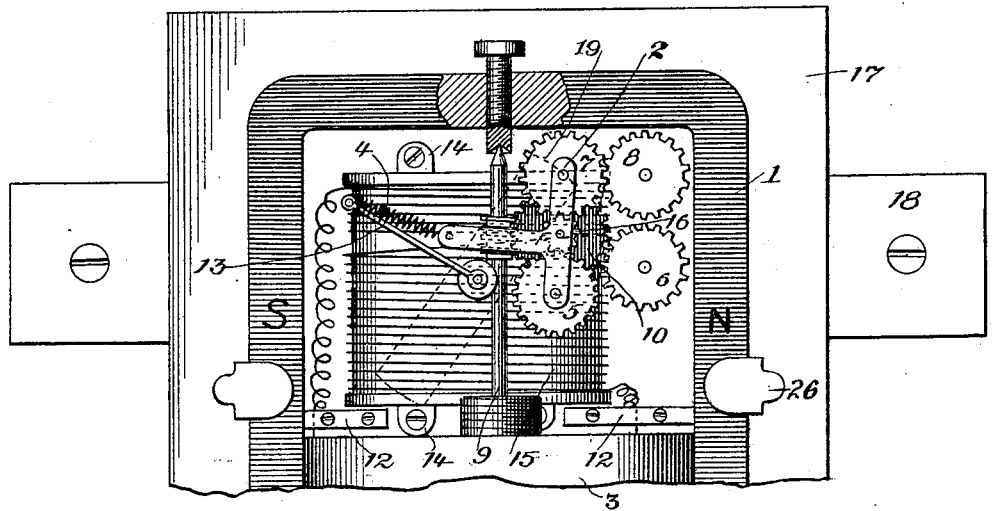

Figure 1 represents the mains of an Edison three-wire system leading from the commutators of two dynamos and feeding current to lamp-circuits at two different points through the meters and showing how my system can be applied. Fig. 2 represents the upper fraction of a meter, showing the mechanism applied in carrying out my invention. Fig. 3 represents the mains of a two-wire lighting system leading from a dynamo feeding current to a group of small meters through a totalizing-meter and service-circuit. It shows also the control-circuit separate and independent from the lighting-circuit.

B indicates a storage battery; S B, a circular knife-switch mounted on a square board; H, the handle of said switch; G, ground connections; M, meters; T M, a totalizing-meter; D, small leads to dial-shifter.

1 is a permanent magnet serving the double duty of producing the field for both the meter-armature and also for the armature of dial-shifter, its opposite points of action for the latter being indicated by the customary signs S and N.

15 is the actuating-coil of shifter; 19, its armature; 4, a small coil-spring; 13, a crank fixed to armature; 12, small pieces of iron leading the magnetism from the magnet 1.

2 is an oscillating yoke carrying at each end gear-wheels.

6 and 8 are the first wheels of the low and high recorders, respectively; 9, the armature-shaft of meter; 17, the backboard of meter; 18, the top cleat on back of meter.

Having described the drawings, I will now give a full description of my invention.

Fig. 1 shows a three-wire system with my invention applied thereto, and consists, as will be readily understood, of positive, neutral, and negative mains connected to and leading from their respective brushes of two dynamos. The mains are tapped at two points of consumption, and one leg of each branch leads through single-pole meters M and M, each having a high and low rate dial, as can be seen through their windows near the top of cover. The other leg of each lighting-circuit being a neutral is tapped with a small wire that leads in and through the meter and dial-shifting mechanism contained therein by the small leads D and D and passing on to the ground G. Near the point of generation the neutral main is tapped with a heavy wire that leads to the top connection of the four-point circular switch mounted on a square board S B. The bottom connection of said switch is to lead to a heavy ground connection G, such as a water-main. The positive and negative side points of the switch lead to terminals of the same polarity of a storage battery B, that shall be of a number of cells to give the desired voltage. I can just as well use an auxiliary dynamo instead of this battery connected in the same way. The switch-knives are three, the center one being a straight strip of copper with a length equal to the full diameter of the switch, having through its center a pivot upon which all oscillate, being all three held together by a piece of insulating material centered at pivot and attached to which is a handle H. The two outer knives are of similar shape to a meat-chopping knife, and on account of the bumpers or stops shown at the top and bottom of board, against which the handle strikes, these two circular knives never become disconnected from the positive and negative terminals from the battery, between the clips of which they are slid back and forth when the switch is worked back and forth. Therefore when the switch is in the position shown the negative of the battery is connected to the line and the positive to the ground. When the handle is thrown up until it strikes the upper stop, as shown by dotted lines, the connection would be reversed and the battery-current sent in the opposite direction over the line operating the polarized dial-shifter in the meters in the opposite direction, throwing off one dial and the other on. The battery connections should be momentary only when the switch-handle is to be thrown back midway, at which point the center knife of switch will connect straight across from the line to ground, in which position it should be left at all times, making a solid ground on the neutral wire of the system, thereby preventing an accidental grounding of one of the outside wires from working the dial-shifters.

Fig. 3 shows a totalizing-meter T M connected on a service-circuit branching from the main wires of the lighting system, and through it is fed a group of three meters. The mains are shown leading from the brushes of a single dynamo and are designated at that point by plus and minus signs. The meters are all provided with two sets of dials, as appears through the meter-windows, and those of the totalizing-meter are connected to and controlled by the same operating-circuit as the customers' meters, which operating-circuit with battery and controlling-switch, as well as the connections to the meters and the general application, are the same as that of Fig. 1, with the exception that in Fig. 3 instead of the line-wire that leads from the top of the switch S B being one of the wires of the lighting-circuit, as in Fig. 1, it is a separate and independent circuit throughout, as may be desirable in some cases, especially for alternating systems. It is obvious that in any case the operating-circuit may be metallic throughout.

The object of the totalizing-meter, which is the second object of my invention, will be fully described after the mechanism is described.

I will now describe the details of the mechanism shown.

Fig. 2 is a fractional view of the upper part of a single-pole meter or recording amperemeter, with a permanent-magnet field. It is shown full size and was claimed and described in my application, (electrical meter,) filed May 23, 1898, Serial No. 681,451, in which 1 is a permanent magnet bent from a steel bar one-half by three inches, and 17 is a wooden backboard to which the magnet is clamped by four bolts, with a claw 26 for grasping the magnet. There are two wooden cleats on backboard, as will appear in Fig. 1 on the meters, and is designated in Fig. 2 by 18. 3 is a cylindrical body three inches in diameter and about five inches long, inclosing the armature. The upper part of the cylinder is shown, out of which comes the vertical armature-shaft 9 through the center of a short neck. The shaft is centered by a point-bearing carried by the top of the magnet, acting as a frame. The shaft is provided with a worm, geared to the wheel 10, which drives the other parts of the recording mechanisms. Pivoted upon the shaft of wheel 10 is a small brass frame 2, free to turn thereon and consisting of two yokes, between which and at their ends are carried similar gear-wheels 5 and 7, both running loose, and the one which may happen to be disengaged will run as an idler while the other is driving its respective dial. Both 5 and 7 are constantly meshed with and driven in the same direction by the small pinion-wheel 16, which is fixed to the shaft of the driving-wheel 10 in the position shown. The upper wheel 7 is engaged with and drives the first wheel 8 of the upper-dial train, the other parts of which are not shown. The yokes and the intermediate wheels 5 and 7 are held in this position by the magnetic armature 19 in back of meter, (shown by dotted lines,) which is connected to an arm or lever forming a part of the yoke 2. When a current of opposite polarity or direction to the one last used is sent over the operating-line from the central station, the polarity of armature 19 will be suddenly changed and thrown in a position nearly at right angles to the one shown, thereby reversing the direction of pull on the lever of the yoke 2 through the medium of the very light coil-spring 4, which will cause it to move on its pivot and disengage 7 from 8 and will engage 5 with the first wheel 6 of the lower-dial train. Now referring to the magnetic armature 19 and the coil 15 and magnet 1, acting upon it, the space in which the working parts are contained is inclosed by the magnet and is three inches wide by two and one-quarter inches high by three inches deep and is backed by the wooden backboard of meter 17. The coil is a thin flat solenoid, with only a narrow slot through its center in which the armature, being a strip of iron, is free to oscillate on a small axis of wire at its center, to which it is rigidly fixed and which is bent into a crank 13 on the outside of the coil at right angles to the strip or bar armature. To the end of this crank is connected the spiral spring controlling the lever of the yoke 2. The solenoid is laid flat against the backboard and is screwed to it by means of four lugs 14, fixed near its corners. It does not occupy much of the space, not extending more than three-fourths of an inch from the backboard. The spool is made of insulating material and is wound with fine wire, offering enough resistance to withstand a considerable voltage. The ends of the coil pass out of the meter, one on either side, down behind the cylinder of the leads D and D, as is shown in both figures. To repel or attract the armature and to strengthen its hold in its angular positions, I use the two small pieces of iron 12 and 12 as pole-pieces screwed to backboard at the bottom corners of the coil and close to the magnet.

The second object of my invention is a check on the meter-readings of each service-circuit feeding a group of small meters, such as the meters in one building or a group of customers at one location, all of these meters being fed from the same service-wires, on which I place one large meter having a high and low rate dial, (and, if desired, a total-dial geared direct to the pinion-wheel 16, which would save the labor of adding the other two readings to get the total,) said meter carrying the total current-feed to the small meters through said circuit, the object of the check being to detect any failure of any of the shifting mechanisms of the small meters from either disorder or fraud, its dials and shifters working in unison with those of the small meters, thereby making a check on the high rate, the low rate, and by adding these amounts get a check on the total current, or a third or total dial on the large meter or on all meters can be geared to run at all times, thus saving calculations.

I do not confine my invention to the forms of apparatus shown, but claim, broadly, any system using apparatus working on the principles set forth by this application, many forms of which would at once arise in the mind of one skilled in this business. A separate circuit from that of the distributing system could be used where it was objectionable or impracticable to use the wires of the system. Instead of using an independent supply of electricity the dials could be operated by momentarily throwing the positive or negative wire of the system to ground. One would operate the high and the other the low dial. One dial might be fixed to record continuously, getting the total consumption, and the other thrown on and off, so as to get only the low-rate consumption and the rates estimated from them.

My system will give great reliability of action on account of not having one switch or loose contact outside of the generating-station, which will also make it easy to keep up.

I am aware that there has been patented apparatus for a two-rate system, in which the dial interchange is operated by clocks located at the various points of consumption; also, that there has been patented a system in which there are used two sets of meters instead of one, one being stopped when the other is started, being controlled from the central station by means of two circuits and a system of double-acting switches and subcircuits at each point of consumption.

I am also aware that there has been a system devised in which a resistance sufficient to reduce the speed of the meter the desired per cent. is inserted in the armature-circuit of meter during the low-rate hours; but I am not aware that any system has ever been known like this one invented by me—viz., a single meter on each consumption-circuit giving two readings and controlled from the central station by an electric circuit—the effect being produced by the reversal of the current, the circuit being single and the same for both operations without subswitches or loose contacts, the shifter being actuated by the current passing through a conductor acting upon a polarized apparatus, the operating-current taken from an independent supply, a large meter on each service-supply giving a triple check of the meters feed through it the full rate, low rate, and total-current supplied, the use of the neutral wire of a three-wire system in conjunction with the ground as an operating-circuit, both operations being performed by it and each operation being determined by the direction of the current through it, for all of which I beg for protection in Letters Patent.

I claim—

1. In a multirate electric metering system, at several different points of consumption, meters having each two registering mechanisms contained therein, giving two records from which a high rate and a low rate may be charged, suitable shifting mechanisms contained in said meters by means of which one set or either set of recording mechanisms can be engaged and disengaged with the driving-gears of said meters; a common operating-station from which run wires branching and leading to the location of the several said meters, magnetically-polarized shifting mechanisms controlled and operated in unison from said operating-station, by means of an electric current sent over said wires.

2. In a multirate electric metering system, a magnetically-polarized dial shifter or switch controlled and operated by an electric current, passed through a conductor acting thereon a current passed through said conductor in one direction causing a movement in a certain direction and a current passed through it in the reverse direction causing a movement in the opposite direction.

3. In a multirate electric metering system, having a multiple of registering mechanisms, a control-circuit being a part of the mains of the distributing system, control apparatus for said registering mechanisms, controlled and operated by an electric current sent over said circuit; the direction of flow of said current determining the action or direction of movement of said control apparatus, a reversed action thereof being produced by the current being reversed in said circuit.

4. In a multirate electric metering system, having two sets of registering mechanisms operated in unison with others from a central station, either one of which may record the load on the same circuit, to which they are adapted, a means for disengaging one set while the other registers, operated by electricity, taken from a source independent of the main system.

5. In a multirate electric metering system, having two sets of registering mechanisms, one for a high rate and one for a low rate of charge, a service-circuit supplying current to a number of customers or meters in one building or locality, said meters having two dials, on said supply-circuit a meter connected to measure the total current fed to the consumer's meters through the circuit, said total-meter having two sets of registering mechanisms working in unison with those of the small meters it is intended to check.

6. In a multirate electric metering system, having a multiple of recording mechanisms oscillating gear-wheels 5 and 7 meshed with the driving gear-wheel 16 and adapted to engage and disengage the recording mechanism substantially as shown and specified.

7. In a multirate electric metering system, having a multiple of recording mechanisms a control apparatus therefor consisting of the pivoted armature 19, the polarizing-coil 15 both working in conjunction with the magnetic field N and S as shown and specified.

8. In a multirate electric metering system, a dial-shifter consisting of an oscillating intermediate gear controlled by an electrically-operated actuating device and connected thereto through the medium of a flexible coupling 4.

9. In a multirate electric metering system, applied to a three-wire distributing system at each point of consumption or metering a dial shifter or switch operated by a current sent from the central station, passing through coils of wire acting upon a polarized element of shifter, the direction of the current through the coils determining the direction of movement of the operation, both operations being performed by the same coils, all of said coils being connected to and branching from a neutral wire of the distributing system.

In testimony that I claim the above I hereunto set my hand this 29th day of June, 1898.

EDWARD S. HALSEY.

In presence of—
ALBERT G. TURNBULL,
J. H. PERRY.